Oct. 14, 1958 E. N. DACUS 2,856,239
MEANS FOR SUSPENDING ROTATABLE OBJECTS IN SPACE
Filed May 20, 1955
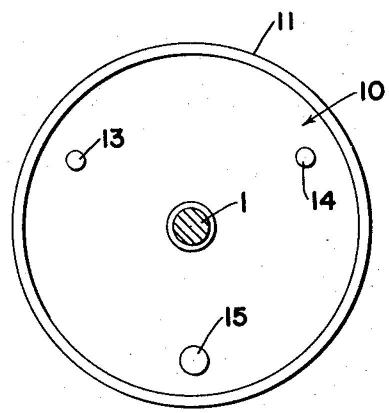
FIG. 3
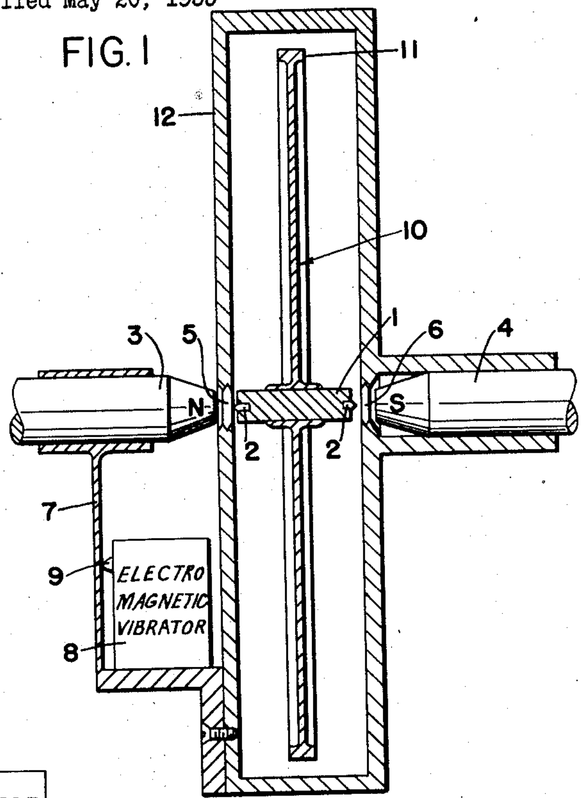
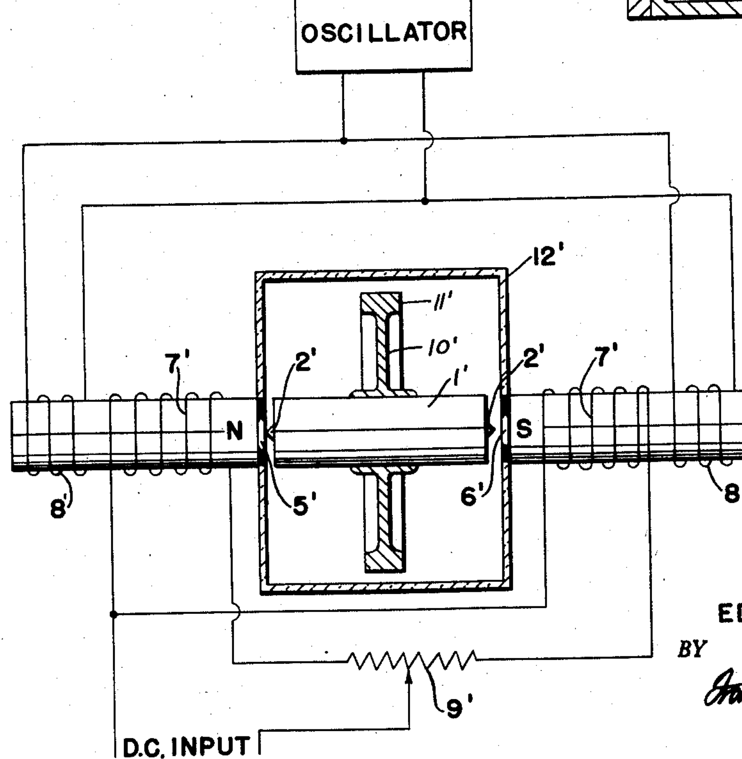
FIG. 2
INVENTOR.
EDWARD N. DACUS
BY
ATTORNEY United States Patent Office 2,856,239 Patented Oct. 14, 1958

2,856,239

MEANS FOR SUSPENDING ROTATABLE OBJECTS IN SPACE

Edward N. Dacus, Rancho Santa Fe, Calif., assignor to Bill Jack Scientific Instrument Co., Solana Beach, Calif., a corporation of California Application May 20, 1955, Serial No. 509,795

20 Claims. (Cl. 308—10)

This invention relates to means for suspending rotatable objects in space wherein a bearing is provided for the rotating object that provides for a minimum and negligible friction and torque for high precision applications.

My invention provides for a low friction and low torque bearing that is particularly adaptable for use in instruments, and the like, where any substantial friction or torque would render the instrument inadequate.

An example of a use of my low friction bearing is in a pendulous device to establish a vertical gravity reference plane. A simple pendulum will establish a true vertical as indicated by the direction of the pull of gravity, while it remains at rest. If the pendulum arm is so long that the period of the pendulum, or the time required for one complete oscillation or swing, is approximately 84.4 minutes, that is, the length of the pendulum arm equals the radius of the earth, and if there is no friction between it and its support, it will then remain at rest and maintain a true vertical regardless of motion or acceleration of the support. A simple pendulum of such length is impracticable. A compound pendulum of practicable size can be made to have a period of 84.4 minutes and will have all the properties of a simple pendulum, provided that it is completely free from friction.

A compound pendulum supported by an axle or spindle can be made to have all of the ideal properties described above, provided that the axle or spindle is supported in frictionless bearings and excepting that it will be free to swing only in a plane perpendicular to the axis of the supporting axle and its bearings, and is therefore capable of indicating a vertical plane only instead of a vertical line. Two such pendulums mounted on a common base, with their axes of rotation approximately parallel to the base but not parallel to each other will, however, define a vertical line at the intersection of their respectively vertical reference planes and will in this configuration constitute a device capable of maintaining an absolute vertical reference regardless of angular displacements of less than 180° and regardless of linear accelerations and displacements of the device in any plane.

However, the vertical need not for many purposes be indicated with absolute accuracy during static conditions nor maintained with absolute accuracy during motion of the device as a whole provided that its accuracy is maintained to within acceptable limits for the intended purpose or use of the device. Compound pendulums, supported by low friction bearings, made in accordance with my invention can be made to have a period long enough, and bearing friction small enough, to define the vertical with sufficient accuracy during static conditions and to maintain a reference with sufficient accuracy during angular and linear displacements of the device to be useful for many purposes.

It is obvious that the device according to my invention, being a bearing having friction and torque approaching zero, has many other applications, such as for a chemical balance, electric meter, and the like, being applicable to any device or instrument in which energy loss arising from friction or torque of a rotating member with respect to a stationary member imposes a limit on the sensitivity or degree of perfection attainable.

Accordingly, one of the primary objects of my invention is to provide a bearing support for a rotatable object in the form of a magnetic suspension means employing a pair of coaxially disposed magnets which are capable, solely by magnetic forces of attraction, of suspending and positioning the suspended object substantially in space between the magnets against all external forces including gravity so as to be free of any mechanical connection with the suspension means and free to rotate about its own axis with substantially zero friction or torque.

A further object is to provide such a bearing support that will include a system of magnets to support the rotatable object against transverse forces due to any cause, including gravity forces.

A further object is to so design and position the magnets that the resultant axial force on the rotatable object will be relatively small.

A further object is to make the parts of the rotatable object and the supports, that act as restraining members as the rotatale object rapidly oscillates axially between the supports, of extremely hard materials, but of unequal hardness, so as to be strong and abrasion resisting and so as to induce the smallest practicable coefficients of friction and torque.

A further object is to construct and position the contacting parts restraining the axial movement of the rotatable object so that forces between them act only on the axis of rotation of the rotatable object.

A further object is to provide means for such control of the axial movement of the rotatable object that contact between it and the opposed parts of the support endures for the least practicable time during each oscillatory cycle, so as to be negligible insofar as factors of friction and torque are concerned, leaving the rotatable object, to all intents and purposes, suspended in space.

With the foregoing and other objects in view, the invention resides in the combination of parts and in the details of construction hereinafter set forth in the following specification and appended claims, certain embodiments thereof being illustrated in the accompanying drawings in which:

Figure 1 is a schematic sectional view of my low friction bearing incorporated in a long period compound pendulum;

Figure 2 is a partial sectional view of a modification thereof; and

Figure 3 is a view in elevation of the weighted wheel of Figures 1 and 2.

Referring to Figure 1, a low friction bearing constructed in accordance with my invention is shown to comprise a ferromagnetic axle 1 supported and aligned by the fields of a pair of coaxial permanent magnets 3 and 4. The magnetic field is predeterminedly of sufficient strength as to be able to support the axle and any essential operating parts which may be attached to it. Embedded at each end of the axle 1 are very hard center tips 2, of any suitable ferromagnetic or other material. These center tips preferably have hemispherical outer surfaces of small radii with the centers of these hemispherical surfaces being on the axis of rotation of the axle 1. Interposed between the hard tips 2 of the axle 1, and the magnets 3 and 4, are restraints 5 and 6 having optically flat surfaces perpendicular to the common axis of the magnets 3 and 4, and being preferably made of a substance harder than the tips 2. These restraints 5 and 6 are so positioned with relation to the tips of the axle 1 that there is sufficient clearance so that only one of the tips 2 can be in contact with the adjacent restraint 5 or 6 at a given instant and with sufficient clearance that neither tip is necessarily in contact with a restraint at a given instant. The magnet 3 has its north pole adjacent to the restraint 5 and the magnet 4 its south pole adjacent to the restraint 6, or vice versa.

The hard tips 2 and the restraints 5 and 6 must have the properties of hardness, capability of achieving an optical polish, great strength and impact resistance and low coefficient of unlubricated friction of the one on the other. In the preferred embodiment the hard tips are made of cemented boron, tungsten, or titanium carbides, while the restraints 5 and 6 are made of industrial diamond. However, it must be understood that other combinations of materials may be used, such as hard steel and sapphire, steel and boron carbide, sapphire and diamond, etc. It is preferable that the tips 2 be less hard than the restraints 5 and 6.

It is essentially a feature of my invention that translation or acceleration of the support in a plane perpendicular to the axis of rotation cannot introduce a torque into the rotating member through the bearing For this to be true, it is necessary that the axle and its attachments be so perfectly balanced that although its axis of rotation may be displaced from the common axis of the magnets 3 and 4, the two always remain substantially parallel. A further condition is that the axle 1 be so constructed that the magnetic field in the air gaps contains no angular inhomogeneities.

With this construction the axle 1 will not float midway between the restraints 5 and 6, where it would be a true frictionless bearing, but will always position itself temporarily against restraint 5 or restraint 6. The magnetic forces which draw the axle against one or the other of the restraints can be made very small by so adjusting the strength or position of the two magnets 3 and 4 so that the longitudinal forces they exert on the axle 1 are substantially equal and opposite. When the two restraints have their flats accurately adjusted relative to the magnets and the axle so that the forces acting on the axle are substantially equal and opposite, the axle can be shifted axially from contact with one to the other by the slightest force. While passing from physical contact with the other restraint the axle is free in space and during that period it is truly a frictionless bearing. The slightest vibration will keep the axle in constant lengthwise oscillating motion between the two restraints. One manner in which I accomplish this is by mounting the magnet 3 on a non-magnetic spring 7 and then forcing the magnet 3 to oscillate lengthwise on the spring 7, and by using the electromagnetic vibrator 8 to vibrate the spring 7 by means of the plunger 9, the magnet 3 is oscillated lengthwise with sufficient amplitude and a frequency suitable to cause the axle 1 to barely make and break contact with each restraint 5 and 6 in turn. It should be noted that the restraints 5 and 6 of non-magnetic material are disposed axially between the ends of the axle 1 and the magnets 3 and 4.

Mounted on the axle 1 shown in Figure 1 is a wheel which would, if suitably balanced, serve as a long period compound pendulum and which is shown in cross section to consist of a thin diaphragm 10 with a heavy rim 11, the diaphragm 10 having deposited thereon weight masses 13, 14 and 15, the latter being the heaviest. The pendulum is shown in an evacuated housing 12. Both the pendulum and the housing are made of a non-magnetic material. It is to be understood that the pendulum and the housing shown in Figure 1 are illustrative as an application of my suspension bearing.

A modification of my invention is shown schematically in Figure 2. In this modified form, electromagnets are used instead of permanent magnets and the oscillating axial movement of the axle 1′ is maintained by controlling the electrical input to the magnet coils. Referring to Figure 2, each of the two coaxial electromagnets has a ferromagnetic core. An optically flat restraint is attached to the pole face of each magnet with its exposed face perpendicular to the axis of the magnets. These restraints 5′ and 6′ are made of any suitable material, as previously described, such as diamond, and are preferably attached to the pole face with a non-magnetic eutectic. The magnets remain fixed during operation and are so spaced that only one of the hard tips 2′ of the axle 1′ can be in contact with the adjacent restraint 5′ or 6′ at a given time and with sufficient clearance, that neither tip is necessarily in contact with a restraint.

Referring further to Figure 2, the two coil windings 7′ are connected to a suitable source of direct current and produce the magnetic fields necessary for supporting and aligning the axle 1′. A voltage divider 9′ in the circuit with the two coils 7′ provides the means for adjusting the magnetic field strength of the two electromagnets so that the forces tending to move the axle 1′ toward one of the restraints 5′ or 6′ is substantially balanced by a force tending to move it toward the other restraint.

Referring further to Figure 2, the two coil windings 8′ are connected to a source of alternating current whose frequency and amplitude of oscillation is so adjusted that the field strength of the two electromagnets will vary with a frequency and magnitude sufficient to keep the axle 1′ in constant axial oscillatory motion.

It must be understood that an important element in my invention is that of keeping the axle in constant axial vibration between the restraints. During the time the axle is in motion it is entirely free from torque and friction, and rubbing friction or torque can occur only during the momentary physical contact between the hard tip and the restraint. By a proper choice of frequency and amplitude of axial motion the fraction of the time during which friction can occur can be made so vanishingly small as to be virtually negligible.

Thus it will be seen that whether I employ permanent magnets or electromagnets, I have provided a magnetic means for horizontal suspension of a rotatable object with attending negligible torque and friction and in which no torque is imposed on the rotatable object due to any movement or acceleration of the suspension device. I have provided a system of magnets that supports the rotatable object against transverse forces, including gravity. I have so positioned and designed the pole strength of the magnets as to reduce the resultant axial force of the rotatable object. I have so designed the surface materials of the contact members and the restraining members to be extremely hard, but of unequal hardness, so as to be strong and abrasion resisting to have the lowest practicable coefficient of friction. I have so designed and positioned the contact members and the restraining members that the forces between them act only along the axis of rotation of the rotatable object. Moreover, I have provided such a control of the axial movement of the rotatable member that contact between the contact members and the restraining members endures for the least practicable time so as to otherwise leave the rotatable object suspended freely in space.

It is essential that the plane of the surface of each restraint be perpendicular to the common axis of the electromagnets. Either the restraints, or the contact tips, or both, should be non-magnetic so as to have non-magnetic material between the axle and the magnets.

The configuration of the contact points and the diamond restraints are such that the point of rubbing contact is fixed on the axis of rotation of the rotor. Contact cannot be elsewhere even when the rotor is displaced relative to the axis of support. This is necessary in order to keep the frictional torque at the absolute minimum during physical contact between these members. Frictional torque is the product of the force tending to cause or prevent rotational motion and the distance from the axis to the point where that force is applied. By keeping the point of rubbing friction at the axis, we keep the effect of that friction at a minimum. If the point of contact were infinitely small and exactly at the axis of rotation, the torque would be this definition be zero. I am able to limit contact to a point or tiny area around the axis of rotation only because I do not require it to serve as the support or to necessarily contribute to the support of the rotor. The support is entirely magnetic. The restraints to axial motion are necessary evils which have novel features for minimizing their effect. Contact can be made only at the axis of rotation because the restraints are not required to contribute to the support.

The fact that the forces attracting the rotor toward one restraint is opposed by an approximately equal and opposite force attracting it toward the other restraint is an essential feature for maintaining minimum friction since the friction between a given pair of surfaces is proportional to the force holding them together.

The relationship between amplitude and frequency of the oscillating component of the magnetic forces is critical if optimum frictional characteristics are to be obtained. It is largely a matter of adjustment of the apparatus that has already been described but since means for accomplishing it are provided it should be borne in mind that the amplitude should be no greater than necessary to cause passage of the rotor from one restraint to the other during oscillation. The frequency should be the maximum which will permit the rotor to make contact at the end of each half cycle.

It is possible to keep the amplitude of oscillation small only if all other forces are in balanced opposition by adjustment of the voltage divider $9^1$ in Fig. 2 or by controlling the energy put into spring 7 by vibrator 8 through plunger 9. The reason for wanting to keep it small is (*a*) to keep the velocity and subsequently the impact as small as possible and (*b*) to have the forces holding the contacts together during the dwell period as small as possible in order to keep friction low. The reason for maximum frequency is to insure minimum dwell time.

It is to be understood that I am primarily concerned with magnetic suspension of objects in space between coaxially disposed magnets, as distinguished from being in overlapping relationship, so that the axis of suspension of the object is maintained substantially coaxial with the suspension magnets.

Moreover, by means of my suspension system, I am able to so suspend the object in space, despite the existence of varying external forces that may be applied to the object, such as the shifting of the axis of suspension relative to the horizontal, as long as these forces do not exceed the ability of the magnetic means for continuing the oscillating of the body being suspended. In other words, my suspension is operable not only under static conditions, but is designed for use in systems that will be operable under dynamic conditions such as occur when used on moving platforms and on moving vehicles, such as aircraft and the like.

I claim:

1. In a magnetic suspension device, a pair of coaxially spaced magnets and a magnetic object, said object being magnetically and rotatably suspended substantially axially between and free from mechanical attachment to either of said magnets, including restraining members disposed adjacent to and axially inwardly between said magnets, a contact member carried by said magnetic object on each side thereof adjacent said magnets, electrical control means mechanically connected to at least one of said magnets for alternately and intermittently shifting said magnetic object axially back and forth to cause said contact members to alternately abut said restraining members in surface engagement in response to magnetic attraction of said magnets, leaving said magnetic object suspended freely in space between intervals of actual abutment engagement of the contact members with the restraining members.

2. In a magnetic suspension device, a pair of coaxially spaced magnets and a magnetic object, said object being magnetically and rotatably suspended substantially axially between and free from mechanical attachment to either of said magnets, including restraining members disposed adjacent to and axially inwardly between said magnets, a contact member carried by said magnetic object on each side thereof adjacent said magnets, electrical control means mechanically connected to at least one of said magnets for alternately and intermittently shifting said magnetic object axially back and forth to cause said contact members to alternately abut said restraining members in surface engagement in response to magnetic attraction of said magnets, leaving said magnetic object suspended freely in space between intervals of actual abutment engagement of the contact members with the restraining members, said magnets being permanent magnets and said electrical control means including means for intermittently shifting at least one of said magnets axially.

3. In a magnetic suspension device, a pair of coaxially spaced magnets and a magnetic object, said object being magnetically and rotatably suspended substantially axially between and free from mechanical attachment to either of said magnets, including restraining members disposed adjacent to and axially inwardly between said magnets, a contact member carried by said magnetic object on each side thereof adjacent said magnets, electrical control means connected to said magnets for alternately and intermittently shifting said magnetic object axially back and forth to cause said contact members to alternately abut said restraining members in surface engagement in response to magnetic attraction of said magnets, leaving said magnetic object suspended freely in space between intervals of actual abutment engagement of the contact members with the restraining members, said magnets being electromagnets and said electrical control means including oscillator means in circuit therewith for alternately and intermittently varying the relative pole strength of said electromagnets.

4. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said wheel and axle axially back and forth to cause said contact members to alternately abut said restraining members in surface engagement in response to magnetic attraction of said magnets, leaving said magnetic wheel and magnetic axle suspended freely in space between intervals of actual abutment engagement of the contact members with the restraining members.

5. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said wheel and axle axially back and forth to cause said contact members to alternately abut said restraining members in surface engagement in response to magnetic attraction of said magnets, leaving said magnetic wheel and magnetic axle suspended freely in space between intervals of actual abutment engagement of the contact members with the restraining members, said magnets being permanent magnets and said electrical control means including means for intermittently shifting at least one of said magnets axially.

6. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means connected to said magnets for alternately and intermittently shifting said magnetic wheel and magnetic axle axially back and forth to cause said contact members to alternately abut said restraining members in surface engagement in response to magnetic attraction of said magnets, leaving said magnetic wheel and magnetic axle suspended freely in space between intervals of actual abutment engagement of the contact members with the restraining members, said magnets being electromagnets and said electrical control means including oscillator means in circuit therewith for alternately and intermittently varying the relative pole strength of said electromagnets.

7. In a magnetic suspension device, a pair of coaxially spaced magnets and a magnetic object, said magnetic object being magnetically and rotatably suspended substantially axially between and free from mechanical attachment to either of said magnets, including restraining members disposed adjacent to and axially inwardly between said magnets, a contact member carried by said magnetic object on each side thereof adjacent said magnets, electrical control means mechanically connected to at least one of said magnets for alternately and intermittently shifting said magnetic object axially back and forth to cause said contact members to alternately abut said restraining members in surface engagement in response to magnetic attraction of said magnets, leaving said magnetic object suspended freely in space between intervals of actual abutment engagement of the contact members with the restraining members, said pair of restraining members and said pair of contact members being of relatively hard surface material, one of such pairs being relatively large flat surfaces to be engaged by relatively small surfaces of the other pair for reducing friction and torque to a minimum upon such engagement.

8. In a magnetic suspension device, a pair of coaxially spaced magnets and a magnetic object, said magnetic object being magnetically and rotatably suspended substantially axially between and free from mechanical attachment to either of said magnets, including restraining members disposed adjacent to and axially inwardly between said magnets, a contact member carried by said magnetic object on each side thereof adjacent said magnets, electrical control means mechanically connected to at least one of said magnets for alternately and intermittently shifting said magnetic object axially back and forth to cause said contact members to alternately abut said restraining members in surface engagement in response to magnetic attraction of said magnets, leaving said magnetic object suspended freely in space between intervals of actual surface abutment engagement of the contact members with the restraining members, said magnets being permanent magnets and said electrical control means including means for intermittently shifting at least one of said magnets axially, said pair of restraining members and pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

9. In a magnetic suspension device, a pair of coaxially spaced magnets and a magnetic object, said magnetic object being magnetically and rotatably suspended substantially axially between and free from mechanical attachment to either of said magnets, including restraining members disposed adjacent to and axially inwardly between said magnets, a contact member carried by said magnetic object on each side thereof adjacent said magnets, electrical control means connected to said magnets for alternately and intermittently shifting said magnetic object axially back and forth to cause said contact members to alternately abut said restraining members in surface engagement in response to magnetic attraction of said magnets, leaving said magnetic object suspended freely in space between intervals of actual abutment engagement of the contact members with the restraining members, said magnets being electromagnets and said electrical control means including oscillator means for alternately and intermittently varying the relative pole strength of said electromagnets, said pair of restraining members and said pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

10. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said magnetic wheel and magnetic axle axially back and forth to cause said contact members to alternately abut said restraining members in surface engagement in response to magnetic attraction of said magnets, leaving said magnetic wheel and magnetic axle suspended freely in space between intervals of actual abutment engagement of the contact members with the restraining members, said pair of restraining members and said pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

11. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said magnetic wheel and magnetic axle axially back and forth to cause said contact members to alternately abut said restraining members in surface engagement in response to magnetic attraction of said magnets, leaving said magnetic wheel and magnetic axle suspended freely in space between intervals of actual abutment engagement of the contact members with the restraining members, said magnets being permanent magnets and said electrical control means including means for intermittently shifting at least one of said magnets axially, said pair of restraining members and said pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

12. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means connected to said magnets for alternately and intermittently shifting said magnetic wheel and magnetic axle axially back and forth to cause said contact members to alternately abut said restraining members in surface engagement in response to magnetic attraction of said magnets, leaving said magnetic wheel and magnetic axle suspended freely in space between intervals of actual abutment engagement of the contact members with the restraining members, said magnets being electromagnets and said electrical control means including oscillator means in circuit therewith for alternately and intermittently varying the relative pole strength of said electromagnets, said pair of restraining members and said pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

13. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said wheel and axle axially back and forth to cause said contact members to alternately abut said restraining members in surface engagement in response to magnetic attraction of said magnets in such a manner that the points of rubbing contact of said contact member are predetermined to be within the axis of rotation of said axle, leaving said magnetic wheel and magnetic axle suspended freely in space between intervals of actual abutment engagement of the contact members with the restraining members.

14. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said magnetic wheel and magnetic axle axially back and forth to cause said contact members to alternately abut said restraining members in surface engagement in response to magnetic attraction of said magnets in such a manner that the points of rubbing contact of said contact member are predetermined to be within the axis of rotation of said axle, leaving said magnetic wheel and magnetic axle suspended freely in space between intervals of actual abutment engagement of the contact members with the restraining members, said magnets being permanent magnets and said electrical control means including means for intermittently shifting at least one of said magnets axially.

15. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means connected to said magnets for alternately and intermittently shifting said magnetic wheel and magnetic axle axially back and forth to cause said contact members to alternately abut said restraining members in surface engagement in response to magnetic attraction of said magnets in such a manner that the points of rubbing contact of said contact member are predetermined to be within the axis of rotation of said axle, leaving said magnetic wheel and magnetic axle suspended freely in space between intervals of actual abutment engagement of the contact members with the restraining members, said magnets being electromagnets and said electrical control means including oscillator means in circuit therewith for alternately and intermittently varying the relative pole strength of said electromagnets.

16. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said magnetic wheel and magnetic axle axially back and forth to cause said contact members to alternately abut said restraining members in surface engagement in response to magnetic attraction of said magnets in such a manner that the points of rubbing contact of said contact member are predetermined to be within the axis of rotation of said axle, leaving said magnetic wheel and magnetic axle suspended freely in space between intervals of actual abutment engagement of the contact members with the restraining members, said pair of restraining members and said pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

17. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means mechanically connected to at least one of said magnets for alternately and intermittently shifting said magnetic wheel and magnetic axle axially back and forth to cause said contact members to alternately abut said restraining members in surface engagement in response to magnetic attraction of said magnets in such a manner that the points of rubbing contact of said contact member are predetermined to be within the axis of rotation of said axle, leaving said magnetic wheel and magnetic axle suspended freely in space between intervals of actual abutment engagement of the contact members with the restraining members, said magnets being permanent magnets and said electrical control means including means for intermittently shifting at least one of said magnets axially, said pair of restraining members and said pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

18. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact member carried by said magnetic axle on each outer end thereof, electrical control means connected to said magnets for alternately and intermittently shifting said magnetic wheel and magnetic axle axially back and forth to cause said contact members to alternately abut said restraining members in surface engagement in response to magnetic attraction of said magnets in such a manner that the points of rubbing contact of said contact member are predetermined to be within the axis of rotation of said axle, leaving said magnetic wheel and magnetic axle suspended freely in space between intervals of actual abutment engagement of the contact members with the restraining members, said magnets being electromagnets and said electrical control means including oscillator means in circuit therewith for alternately and intermittently varying the relative pole strength of said electromagnets, said pair of restraining members and said pair of contact members being of relatively hard surface material, one of such pairs being relatively harder than the other pair and one of such pairs having relatively large flat surfaces to be engaged by relatively small surfaces of the other pair for reducing friction and torque to a minimum upon such engagement.

19. In a magnetic suspension device, a pair of coaxially spaced magnets and a magnetic object, said magnetic object being magnetically and rotatably suspended about its axis substantially axially between and free from mechanical attachment to either of said magnets, including restraining members disposed adjacent to and axially inwardly between said magnets, a contact point carried by said magnetic object on each side thereof adjacent said magnets, said contact points being fixed on the axis of rotation of said object, electrical control means connected to said magnets for alternately and intermittently shifting said magnetic object axially back and forth to cause said contact members to alternately abut said restraining members in surface engagement in response to magnetic attraction of said magnets, leaving said magnetic object suspended freely in space between intervals of actual abutment engagement of the contact members with the restraining members, said magnets being electromagnets and said electrical control means including oscillator means for alternately and intermittently varying the relative pole strength of said electromagnets, said pair of restraining members and said pair of contact points being of relatively hard surface material, one of such pairs being relatively harder than the other pair, said restraining members having relatively large flat surfaces disposed perpendicular to the axis of rotation of said object to be engaged by relatively small surfaces of the contact points of said object for reducing friction and torque to a minimum upon such engagement.

20. In a magnetic suspension device, a pair of coaxially spaced magnets and a weighted magnetic wheel having a magnetic axle, said magnetic wheel and axle being magnetically and rotatably suspended substantially axially between and free from mechanical attachment to either of said magnets, including restraining members disposed adjacent to and axially inwardly between said magnets, a contact point carried by said magnetic axle on each outer end thereof, electrical control means mechanically connected to at least one of said magnets for alternately and intermittently shifting said magnetic wheel and magnetic axle axially back and forth to cause said contact members to alternately abut said restraining members in surface engagement in response to magnetic attraction of said magnets, leaving said magnetic wheel and magnetic axle suspended freely in space between intervals of actual abutment engagement of the contact members with the restraining members, said pair of restraining members and said pair of contact points being of relatively hard surface material, one of such pairs being relatively harder than the other pair, said restraining members having relatively large flat surfaces disposed perpendicularly to said contact points to be engaged by relatively small surfaces of said contact points as the latter rotate fixed on the axis of rotation of said wheel for reducing friction and torque to a minimum upon such engagement.

References Cited in the file of this patent

UNITED STATES PATENTS

| | | |
|---|---|---|
| 624,142 | White | May 2, 1899 |
| 1,702,075 | Chireix et al. | Feb. 12, 1929 |
| 2,203,411 | Green | June 4, 1940 |
| 2,566,221 | Lovell | Aug. 28, 1951 |
| 2,725,266 | Mendelsohn | Nov. 29, 1955 |
| 2,733,857 | Beams | Feb. 7, 1956 |